Patented Jan. 9, 1923.

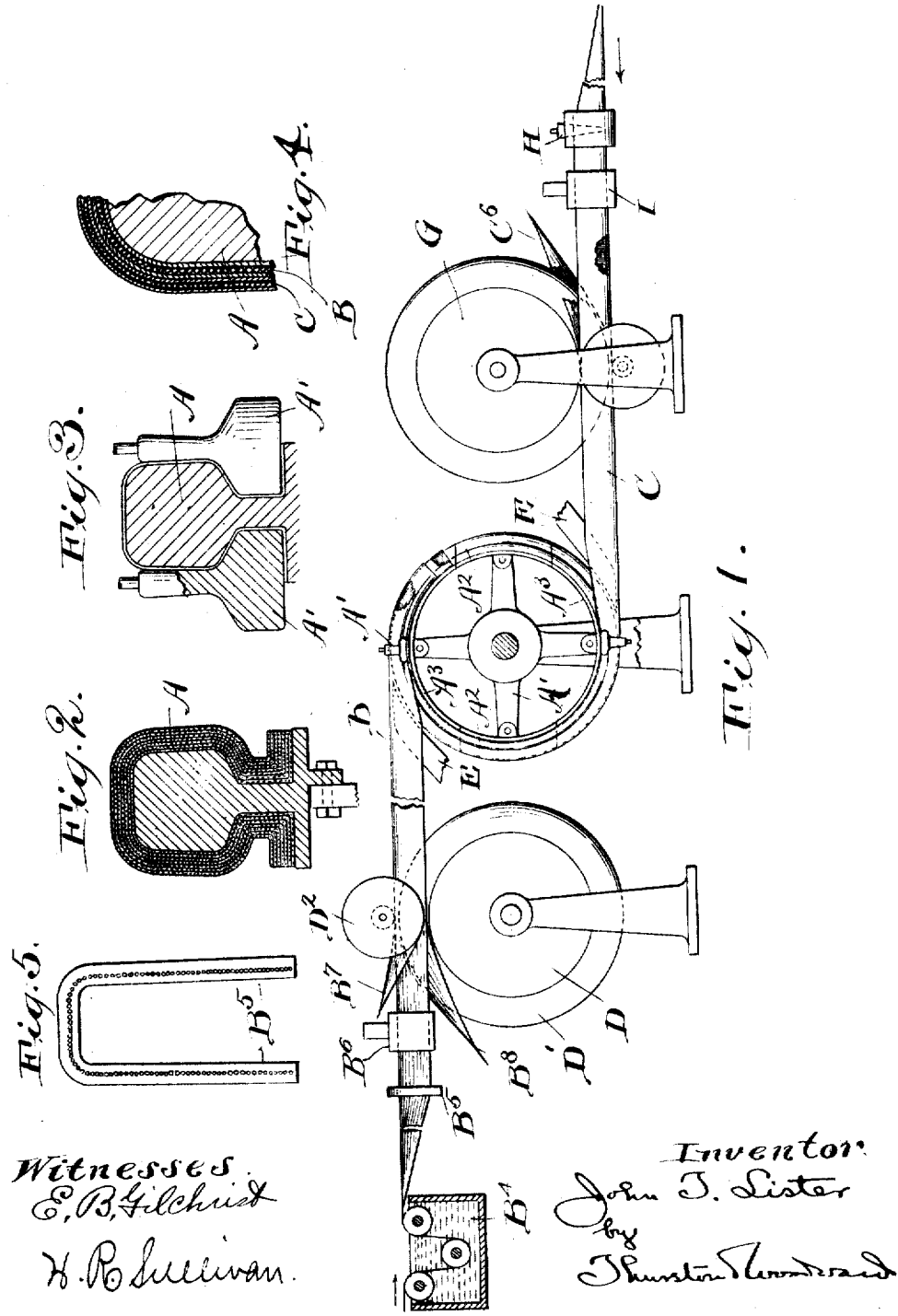
Jan. 9, 1923. 1,441,514
J. T. LISTER.
APPARATUS AND METHOD FOR FORMING TIRES
FILED FEB. 13, 1907
3 SHEETS-SHEET 1

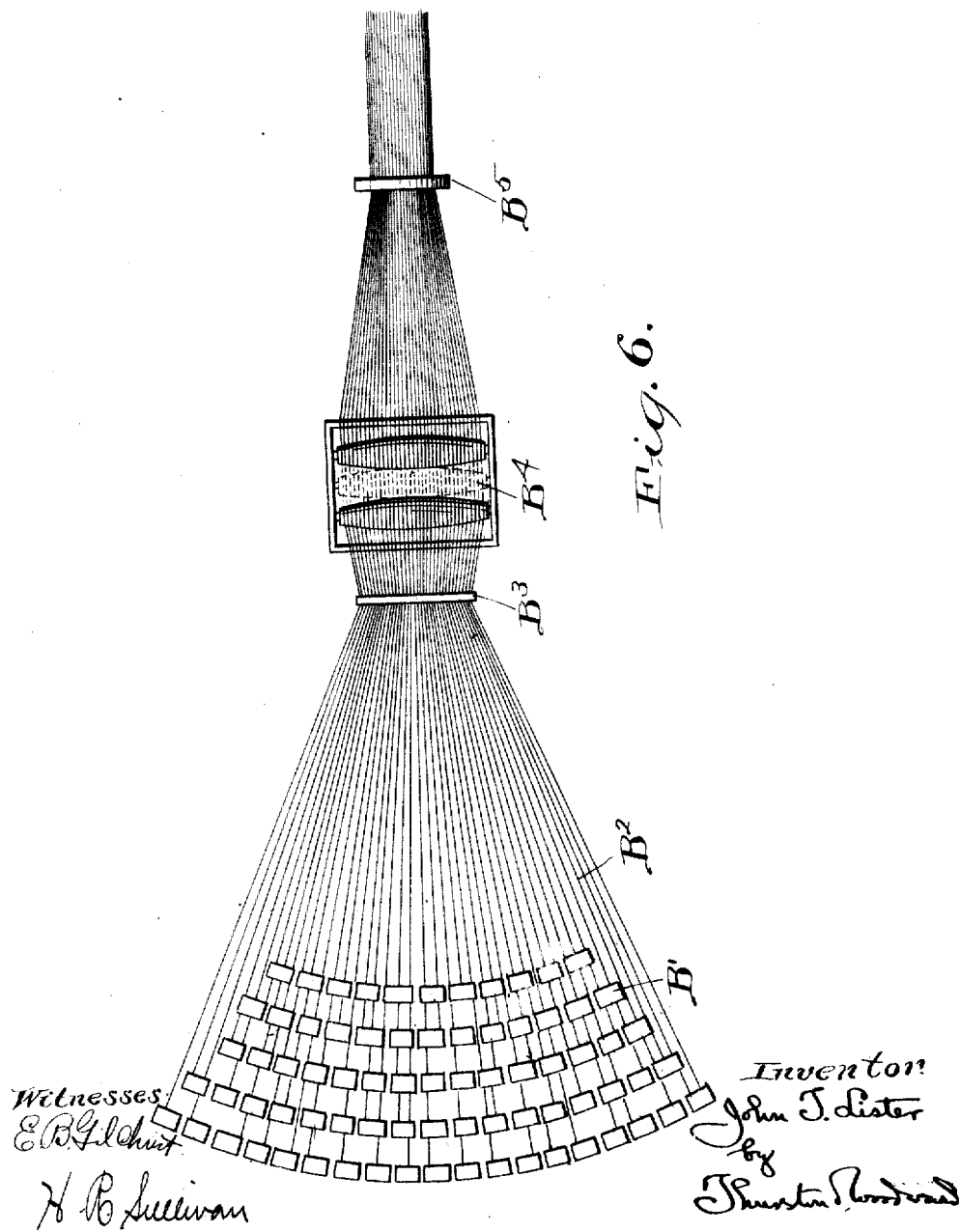

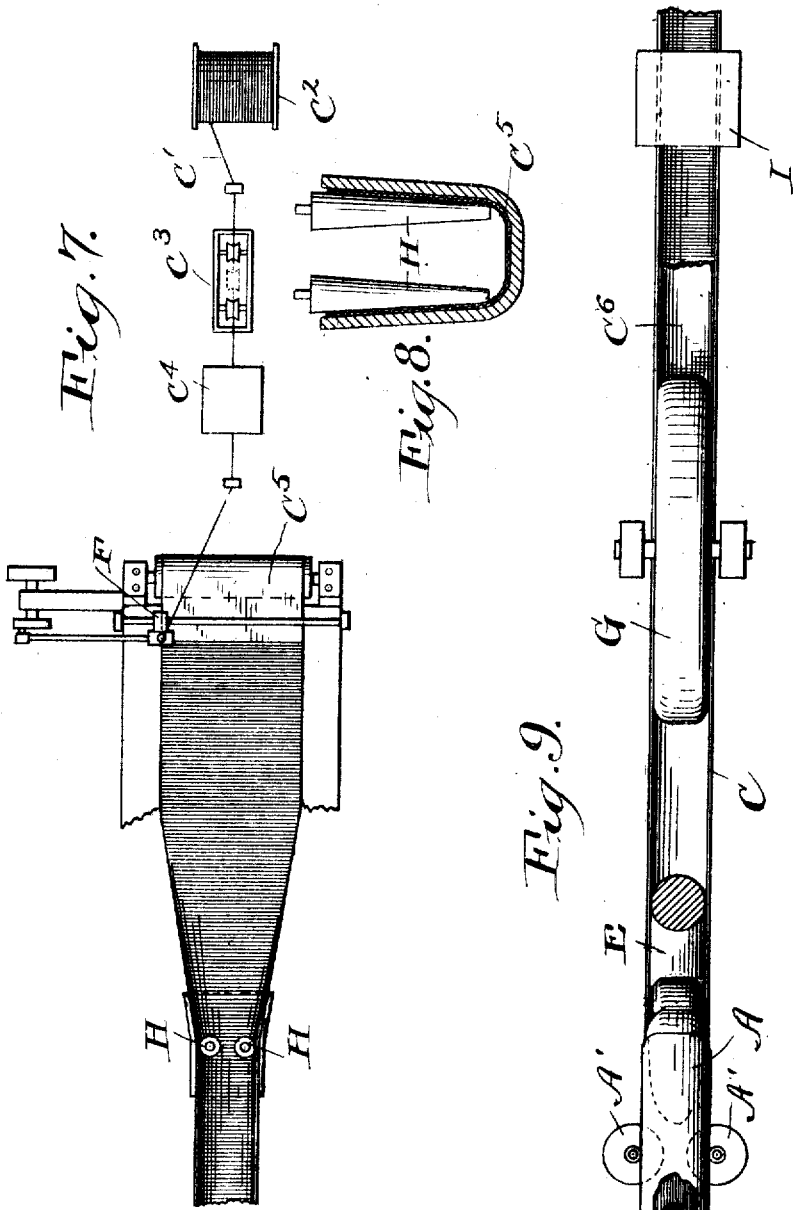

1,441,514

UNITED STATES PATENT OFFICE.

JOHN T. LISTER, OF CLEVELAND, OHIO.

APPARATUS AND METHOD FOR FORMING TIRES.

Application filed February 13, 1907. Serial No. 357,134.

*To all whom it may concern:*

Be it known that I, JOHN T. LISTER, a citizen of the United States, residing at Cleveland, in the county of Cuyahoga and State of Ohio, have invented a certain new and useful Improvement in Apparatus and Methods for Forming Tires, of which the following is a full, clear, and exact description.

The object of the present invention is to provide apparatus for the manufacture of tires comprising, in their structure, layers of different material, such as woven fabrics or unwoven cord or textile material in any suitable form, together with rubber.

In the illustration of the invention here shown I have contemplated the use of the apparatus in the formation of a tire shoe or outer sheath in which there is a layer of cords extending side by side circumferentially around the sheath and a second layer of cords separated from the first layer of cords by rubber, in which second layer the cord is laid so as to run from side to side transversely of the shoe. While this particular form of tire shoe is shown, it is obvious that the main features of the mechanism may be used for constructing tires in the several layers of which the cords may all run in one direction or in which the order of the layers of cord may be changed.

Referring to the accompanying drawing, Figure 1 shows, in side elevation, the general arrangement of the apparatus employed in connection with the revolving core. Figure 2 is a cross section of the core showing a manner of attachment to the spider by which it is revolved, the several layers of a tire in the process of formation being also indicated in cross section. Figure 3 is a cross section of the mold showing a pair of complementary formers. Figure 4 is a detail section, enlarged to show the appearance in the cross section of a couple of layers used in building up the tire. Figure 5 is an elevation of a guide used for the longitudinal running threads. Figure 6 is a plan, illustrating the general arrangement of the mechanism for feeding in the cord which form the upper sheet in Figure 1. Figure 7 is an enlarged detail plan showing the arrangement of the parts for placing a layer of cord transversely upon one of the rubber sheets used in forming the tire. Figure 8 is a detail. Figure 9 is a plan showing the arrangement of the apparatus for handling the compound layer made up of transversely disposed cord and the rubber sheets with which it is combined.

The manner in which I utilize my revolving core for the purpose of manufacturing tires is to attach the sheets, or layers of material, of which I wish to construct the tire, to the core, A, which is of the proper form to receive and shape the sheets, and revolve the core, drawing the sheets thereon until the required number of layers are assembled, and the sheets are cut and the proper joints made, whereupon the formed tire is ready for removal from the revolving mechanism for subsequent vulcanization.

In the arrangement of apparatus shown I have illustrated the mechanism as used for assembling together alternate layers of two varieties, in one of which, B, a number of longitudinally parallel cords lying side by side are held between two rubber sheets, and in the other of which, C, a cord is laid back and forth transversely between two rubber sheets. In Figures 1 and 6 I have shown the arrangement by which the first mentioned layer is constructed. A series of spools B' supply the parallel cords B² through a proper feeding rack B³ to a bath B⁴ of rubber cement, in those cases where it is desired to use the cement, from which the cords are carried through a shaping guide B⁵ and a cold blast B⁶ to assist in the rapid evaporation of the cement solvent and consequent drying of the cement. After this the cords are carried to a wheel D which has a rim D' of U shape, approaching the shape and size of the revolving core A.

In conjunction with this forming wheel I use an adjunctive shaping wheel D² to coact with the rim D' to give the sheet its proper form. At the point, where these wheels receive the sheet and draw it into proper shape, I feed a sheet of rubber B⁷ above the layer of thread and a sheet of rubber B⁸ beneath the same. By this arrangement the threads, together with the rubber sheets, will be brought together in approximately the form which they will occupy on the revolving core and in the finished tire, the cement on the threads uniting them firmly to the sheets of rubber as soon as they come in contact.

It will be noted that, by feeding the cords to the shaping wheel D in this manner, the feed of the cords at the outer edges, where they are in the portion of the shaper rim D' having the least diameter, will take place at a less rapid rate than the feed of the cords about the middle portion of the layer. This is as it should be, since the length of cord put into the middle portion of the tire should, of course, be greater than the length of the cord put into the inner edges thereof, since, otherwise, either the cords in the middle portion would have to be stretched sufficiently to compensate for the difference in the length of cord originally put into the same or the cords on the edge would be somewhat buckled or crowded to take care of the surplus cord which might be present.

After passing from the shaping wheel D the layer is led preferably over a guiding horn E to prevent the soft fresh rubber from sagging against the revolving core A until the desired point is reached. At this point, the composite layer, B, comprising the cord B' with the two rubber sheets, B², B³ passes on to the revolving mold, A whereupon it is suitably pressed, according to the necessities of the case, with rotating complementary forming wheels A'. In the particular instance illustrated, I also use a second and different layer C for forming the tire which, as shown in Figures 7 and 8 comprises a layer of cord laid transversely back and forth across the sheet. This cord C' is taken from a spool C² and led through a cement bath C³ if desired and suitable drying apparatus C⁴ to a mechanically and rapidly operating shuttle F which feeds the cord back and forth across a lower rubber sheet C⁵ close to the point where this layer is fed, together with an upper layer C⁶, to a shaping wheel G similar to the wheel, D, previously described.

Just before the layer of cord upon the lower rubber sheet, C⁵, is united with the upper sheet, C⁶, the lower sheet, with the cord thereon, is curved into a U shape and passed through suitable mechanism, such as a guide having a pair of internal, inverted, conical rolls, H H, which latter rotate so as to crowd the outer ends of the cord layer close together. This is for the purpose of properly adjusting them in view of the fact that the center of the rubber sheet is drawn along more rapidly than the outer edges. As soon as this crowding is effected, it is preferable to apply a cold blast, I, to the layer so as to set the cords in position, whereupon the upper layer, C⁶, is united with the composite transverse cords made up of cords in the lower sheet of rubber.

The layer, C, formed by the union of these two rubber sheets C⁵ C⁶ with the transverse layer of cord, is then carried along to the rotating core A to which it is attached and is preferably fed thereon to a point diametrically opposed to the point to which the first mentioned layer is fed.

By the means described, it is evident that I may apply a greater number of layers to the rotating core simultaneously, and these layers may be all alike or different, according to the desire of the operator.

It will be noted, on referring to Figure 1, that the core A is made in sections and is removably attached to the spider A' on which it is mounted and rotated, Figure 2 showing a preferred manner of attachment. After the requisite number of layers have been wound on the core and the webs have been cut, the core is loosened from the spider on which it is held and its place may be taken by another one while the green tire is being cured.

When it is desired to remove the core from the tire all that is necessary is to draw out the removable sections A² which, as shown, have their ends cut along parallel lines for this purpose. With these removable sections A² out, the other sections A³ then also may obviously be readily withdrawn.

It is not necessary to dwell upon the importance of this invention to the art or the great shortening of time within which composite tire sections may be constructed as compared with the present methods.

Having thus described my invention, I claim:

1. In a tire making machine, a rotatable core, a convex roll over which materials may be fed and united into a fabric having approximately the shape it is to occupy in the completed tire, and a guiding horn so shaped and positioned between said roll and core as to retain such preliminary shape and preventing the fabric from sagging against the core until the desired point is reached.

2. In a machine for making tires or tire strips, means comprising a movable core for arranging unwoven cord in strip form and simultaneously shaping the strip by giving it a curvature of substantially the cross sectional outline of a tire.

3. In the art of making tires or tire strips, means including a source of cord supply and cooperating formers for forming a tire strip whose strength giving element is unwoven cord and shaping the strip to a curvature of substantially the sectional outline of a tire.

4. In the art of making tires or tire strips, means comprising cooperating forming elements for forming a strip of unwoven cord and rubber and simultaneously shaping the strip to substantially the cross sectional outline of a tire.

5. In a machine of the character described, means comprising a forming core and rotary means cooperating therewith for forming unwoven fibrous material into a strip and for shaping the strip to substantially the cross sectional outline of a tire forming core.

6. In a tire making machine, a rotary core to which strips may be applied, and means for forming and shaping a strip whose base is unwoven fibrous material so that the strip will conform substantially to the cross sectional shape of the core when applied to the latter.

7. In apparatus for making tire fabric and tires, a core to which strips may be applied, and means for forming and shaping a strip of unwoven fibrous material and rubber and feeding the same to the core.

8. In apparatus for making tire fabric and tires, a core to which strips may be applied, and means for forming and shaping strips of unwoven cord and rubber with the cord of one strip at an angle to the cord of the other strip and feeding the strips to the core.

9. The method of forming a tire forming strip adapted to be applied to the core of a tire forming machine which comprises forming the strip from material including rubberized unwoven cord and at the same time shaping the strip to substantially the cross sectional outline of a tire.

10. The method of making a tire forming strip adapted to be applied to the core of a tire making machine which comprises feeding cord or other unwoven strip forming material onto a former and shaping the strip on the former to substantially the cross sectional outline of the core.

11. The method of making a tire forming strip adapted to be applied to a core of a tire making machine, which comprises feeding unwoven rubberized cord and strip rubber and simultaneously forming the same into strip form and shaping the strip to substantially the cross sectional outline of the core.

12. The method of forming tires which comprises forming a strip of unwoven parallel cords shaping the strip and in the same continuous operation applying it to the core of a tire making machine.

13. The method of forming tires which comprises forming and shaping a strip composed of unwoven parallel cords and rubber and then applying the strip to the core of a tire making machine.

14. The method of making tires, which comprises in one continuous operation forming the strip of unwoven cord and rubber, shaping the strip to the cross sectional outline of the core of a tire making machine, and applying the strip to the core.

15. The method of making a tire, which comprises forming and shaping a plurality of strips of unwoven cords and rubber with the cords of one strip running at an angle to the cords in the other strip and applying the strips to the core of a tire making machine.

16. In a tire making machine, the combination with a core, means for feeding upon said core a plurality of bands formed of unwoven cord and sheet rubber, the cord of each band being arranged so that the bands superimposed upon the core will have cords extending at angles relative to each other.

17. In a tire making machine, a core and a fabric-smoothing roller mounted adjacent to one side thereof and acting to lay fabric thereon, said roller comprising a portion of smaller diameter flaring to a portion of larger diameter.

18. In a tire making machine, the combination with means for supplying tire forming material, a core upon which said material is fed, and a member located adjacent the core and serving to guide the tire forming material to the core.

19. In a tire making machine, means for supplying a strip of tire forming material, a core upon which said strip is fed, and a curved member adjacent the core and serving to guide the tire forming material onto the core.

20. In a tire making machine, means for supplying tire forming material, a core upon which said material is fed, a member adjacent the core and serving to support and guide the tire forming material onto the core.

21. In a tire making machine, the combination of means for supplying tire forming material, a core upon which said material is fed, a member located adjacent the core, said member being so shaped and positioned that it guides the material onto the core so that the material undergoes no substantial change in form or shape in passing from said member to the core.

22. The method of making tires which consists in forming a strip of tire forming material and in the same continuous operation feeding it upon a tire forming core.

23. The method of making tires which consists in forming a strip of tire forming material comprising unwoven cord and rubber, and in the same continuous operation feeding it upon a tire forming core.

24. The method of making tires which consists in forming a strip, by feeding a strip of rubber and cords into engagement, rolling the same, and in the same operation feeding the formed strip to a tire forming core.

25. The method of making tires which consists in forming a strip by feeding a strip of rubber and unwoven cord, rolling the same together, and as a continuous operation feeding the strip upon a tire forming core.

26. The method of making tires which comprises forming a tire forming strip transversely curved, and in the same continuous operation feeding the curved strip upon a tire forming core.

27. In a tire forming apparatus, a rotary core upon which a tire casing is adapted to be formed, and means for forming the strip and at the same time imparting a transverse curvature corresponding substantially to the cross sectional shape of the core and for supplying the strip to the core in the same continuous operation which forms and shapes it.

In testimony whereof, I hereunto affix my signature in the presence of two witnesses.

JOHN T. LISTER.

Witnesses:
J. M. WOODWARD.
E. B. GILCHRIST.